United States Patent [19]

Hunziker

[11] Patent Number: 5,018,318

[45] Date of Patent: * May 28, 1991

[54] APPARATUS FOR SURFACE TREATMENT OF WORKPIECES

[76] Inventor: Werner Hunziker, Im Kopfli 262, CH-5054 Kirchleerau, Switzerland.

[*] Notice: The portion of the term of this patent subsequent to Jul. 4, 2006 has been disclaimed.

[21] Appl. No.: 446,210

[22] Filed: Dec. 5, 1989

[30] Foreign Application Priority Data

Dec. 6, 1988 [CH] Switzerland .......................... 4514/88

[51] Int. Cl.$^5$ .......................... B24C 3/10; B24C 3/18; B24C 9/00
[52] U.S. Cl. ..................................... 51/417; 51/422; 198/373; 198/658
[58] Field of Search ................. 51/410, 419, 422, 423, 51/427, 17, 417, 215 AR, 418; 198/630, 658, 750, 752, 373

[56] References Cited

FOREIGN PATENT DOCUMENTS 0205738 2/1986 European Pat. Off. .
0289845 4/1988 European Pat. Off. .

*Primary Examiner*—Frederick R. Schmidt
*Assistant Examiner*—Blynn Shideler
*Attorney, Agent, or Firm*—Peter K. Kontler

[57] ABSTRACT

Apparatus for surface treatment of workpieces has a rotary horizontal cage with inclined end walls and a set of elongated rod-shaped or bar-shaped components between the end walls. The end walls are rotatable in inclined carriers which cause them to act not unlike swash plates and to cause the components to reciprocate in response to rotation of the cage about its axis. The end portions of the components are tensioned by springs which react against the end walls and bear against axially adjustable nuts at the free ends of the components at the outer sides of the end walls. The end walls have relatively large holes to ensure that the components are not flexed during reciprocation in response to rotation of the cage. Workpieces to be treated, e.g., by sprays of solid particles, are introduced through one of the end walls and advance toward the other end wall at a speed which is determined by the extent of reciprocatory movement of the components and the rotational speed of the cage.

15 Claims, 3 Drawing Sheets

APPARATUS FOR SURFACE TREATMENT OF WORKPIECES

BACKGROUND OF THE INVENTION

The invention relates to improvements in apparatus for surface treatment (such as deburring, cleaning or polishing) of metallic, plastic and/or other workpieces. More particularly, the invention relates to improvements in apparatus of the type disclosed in commonly owned U.S. Pat. Nos. 4,218,854, 4,368,599, 4,757,647 and 4,844,232. The disclosures of these patents are incorporated herein by reference. Apparatus of the type to which the present invention pertains are also disclosed in published European patent applications Nos. 205 738 and 289 845.

Commonly owned U.S. Pat. No. 4,844,232 discloses an apparatus wherein the shell of the cage-like receptacle for workpieces is composed of longitudinally extending cable-like, rope-like, wire-like or rod-like components. The end portions of the components are secured to two end walls which act not unlike wobble plates or swash plates and cause the components to move back and forth in parallelism with the axis of rotation of the receptacle to thus advance the workpieces in the interior of the shell in a direction from the one toward the other axial end of the receptacle. As shown in FIG. 4 of this patent, the connections between the end portions of the components and the end walls include ball joints. Each ball joint includes a socket having a concave surface and a spherical head which extends into the socket and is biased against the concave surface. A drawback of such joints is that they are expensive as well as that their parts are subjected to extensive wear when the apparatus is in use. Moreover, such joints are overly affected by certain treating agents for the workpieces in the shell of the receptacle, for example, by certain types of fluids or by certain flowable pulverulent and/or granular solid materials which are propelled against the workpieces to remove burrs, to achieve a certain surface finish and/or for other purposes. Solid particles which penetrate between the socket and the head of a ball joint are likely to rapidly damage or totally destroy the joint. Once a joint fails to function, the respective component is subjected to pronounced bending or flexing stresses whenever the apparatus is put to use, and such repeated flexing causes the material of the component to tire so that the component breaks shortly after partial or complete destruction of the respective ball joint

OBJECTS OF THE INVENTION

An object of the invention is to provide a novel and improved apparatus which is more rugged and the parts of which can stand more pronounced wear than in heretofore known apparatus.

Another object of the invention is to provide a novel and improved receptacle for use in the above outlined apparatus.

A further object of the invention is to provide a receptacle wherein the cable-like, rope-like, rod-like, wire-like or analogous components of the shell are connected to the respective end walls in a novel and improved way.

An additional object of the invention is to provide novel and improved joints between the components of the shell and one or both end walls.

Still another object of the invention is to provide joints which are less likely to be affected by work treating agents than heretofore known joints and the useful life of which is much longer than that of ball joints.

A further object of the invention is to provide an apparatus which can be designed for the treatment of relatively small or larger workpieces or of random mixtures of smaller and larger workpieces.

Another object of the invention is to provide an apparatus wherein a relatively small number of specially designed joints suffices to prolong the useful life of the receptacle for workpieces.

An additional object of the invention is to provide a novel and improved shell for use in the receptacle of the above outlined apparatus.

A further object of the invention is to provide a novel and improved method of prolonging the useful life of the receptacle for workpieces which are to be bombarded by particles of solid material, subjected to the action of flames and/or subjected to the action of gaseous and/or liquid fluids during transport through the shell of the receptacle.

Another object of the invention is to provide the apparatus with novel and improved means for limiting the extent of flexing of end portions of rod-like or wire-like components forming part of or constituting the shell of the receptacle for workpieces.

SUMMARY OF THE INVENTION

The invention is embodied in an apparatus for advancing and changing the orientation of metallic and/or other workpieces, for example, for removing burrs, webs and other undesirable protuberances from metallic or plastic workpieces. The improved apparatus comprises a rotary receptacle having a preferably horizontal or nearly horizontal axis of rotation and including a tubular shell surrounding the axis and having an internal space for workpieces and a plurality of elongated wire-like, rod-shaped or otherwise configurated and/or produced components extending in substantial parallelism with the axis and having first and second end portions. The receptacle further comprises first and second end walls and means for connecting the end walls to the respective end portions of the elongated components. In accordance with a feature of the invention, the connecting means includes universal joints at least between the first end wall and the first end portions of the components, preferably between each of the first and second end walls and the respective end portions of the components. The universal joints are designed to avoid the need for flexing of the end portions of components while the components move longitudinally during rotation of the shell about the axis, at least in a predetermined portion of the shell (preferably in the lower portion beneath the axis of the receptacle). To this end (i.e., in order to ensure that the components will reciprocate during rotation of the shell, the means for rotating the shell about the axis includes means for maintaining the end walls at an oblique angle to the axis of the receptacle s that the end walls act not unlike wobble plates or swash plates which are disposed in two parallel planes.

The joints include resilient means for subjecting the components to longitudinal tensional stresses, and the end walls preferably include rings which are indirectly connected with the respective end portions of the components.

The first end wall is provided with holes for the components, and the first end portions of the components extend with radial play through and outwardly (i.e., away from the second end wall) beyond the first end wall. The joints further include stops which are provided on the first end portions of the components and the resilient means includes or can include springs which react against the first end wall and bear against the respective stops to thereby subject the corresponding components to longitudinal tensional stresses. The springs can include axially stressed coil springs which surround the first end portions of the components between the first end wall and the respective stops.

The first end portions of the components can be provided with external threads, and the stops can include nuts or sets of nuts having internal threads in mesh with the respective first end portions. This renders it possible to select the bias of the springs by the simple expedient of rotating the nuts or sets of nuts relative to the respective components.

Ring-shaped bearings can be interposed between the springs and the respective stops. In addition to or in lieu of such bearings, the apparatus can further comprise a deformable insert which is interposed between the springs and the stops. The arrangement may be such that the first end wall includes a first ring which is provided with the aforementioned holes for the first end portions of the components, and the insert includes a second ring which is or can be concentric with the first ring. The second ring is preferably provided with holes for the first end portions of the components and is elastically deformable, at least in the regions of its holes.

The shell can further comprise additional elongated wire-like or rod-shaped components having first and second end portions which extend through holes, slots or otherwise configurated apertures provided therefor in the first and second end walls. The first end portions of the additional components can be connected with the aforementioned insert and the second end portions of the additional components can be connected to a second ring-shaped insert which is outwardly adjacent the second end wall or forms part of the second end wall. The additional components can be disposed at a first distance and the longitudinally tensioned components can be disposed at a greater second distance from the axis of the receptacle.

Still further, the apparatus can comprise at least one annular supporting member between the first and second end walls. The supporting member is provided with holes and the components of the shell extend through such holes with at least some radial play. Means is provided to hold at least some of the components (e.g., the longitudinally tensioned components) and the at least one supporting member against movement relative to each other in the axial direction of the receptacle. The holding means can comprise pairs of clamping elements (e.g., in the form of nuts) which engage the at least some components and flank the at least one supporting member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
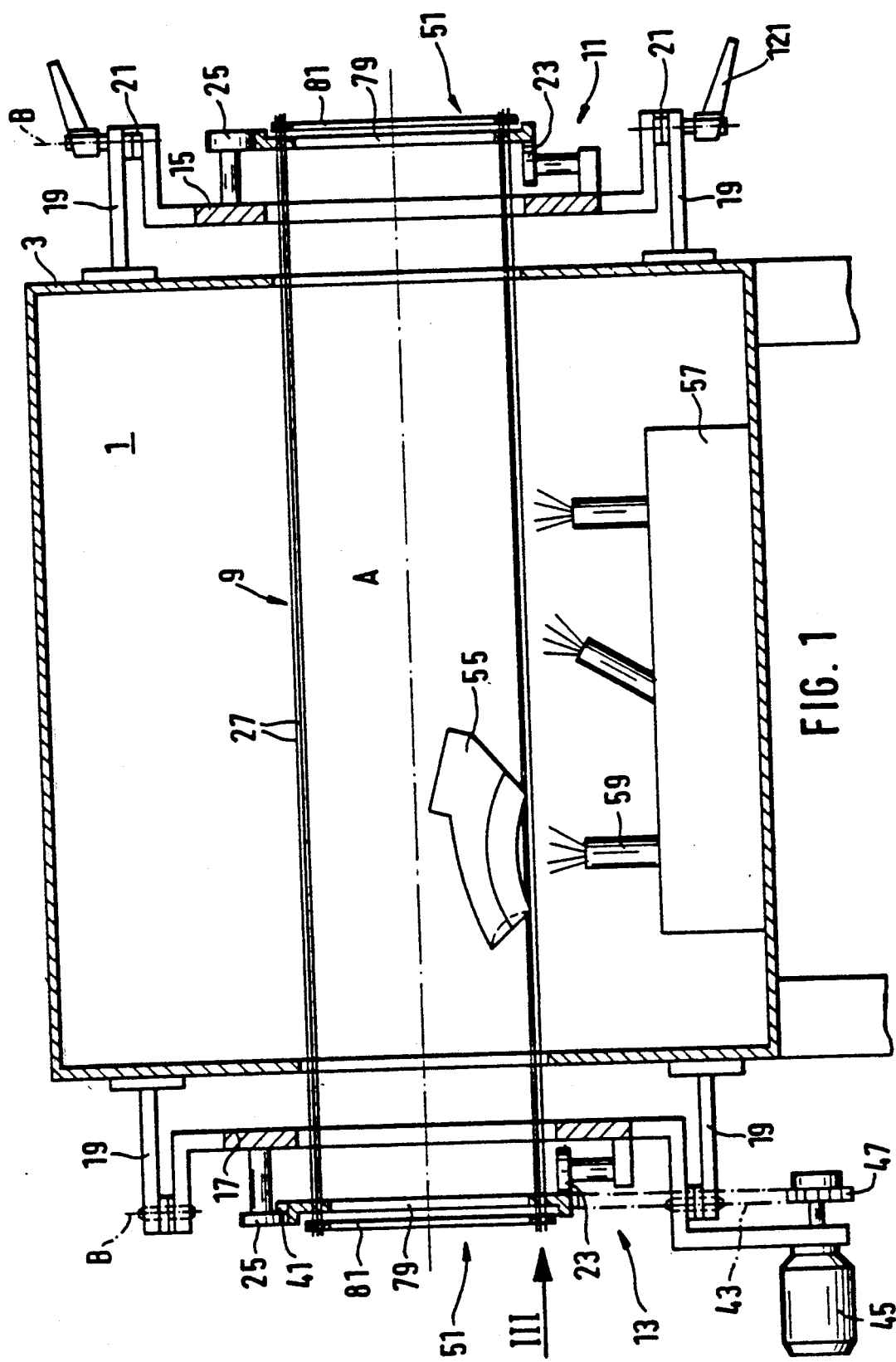
FIG. 1 is a central longitudinal vertical sectional view of an apparatus which embodies one form of the invention, the section being taken in the direction of arrows as seen from the line I—I of FIG. 2.
Figure 2:
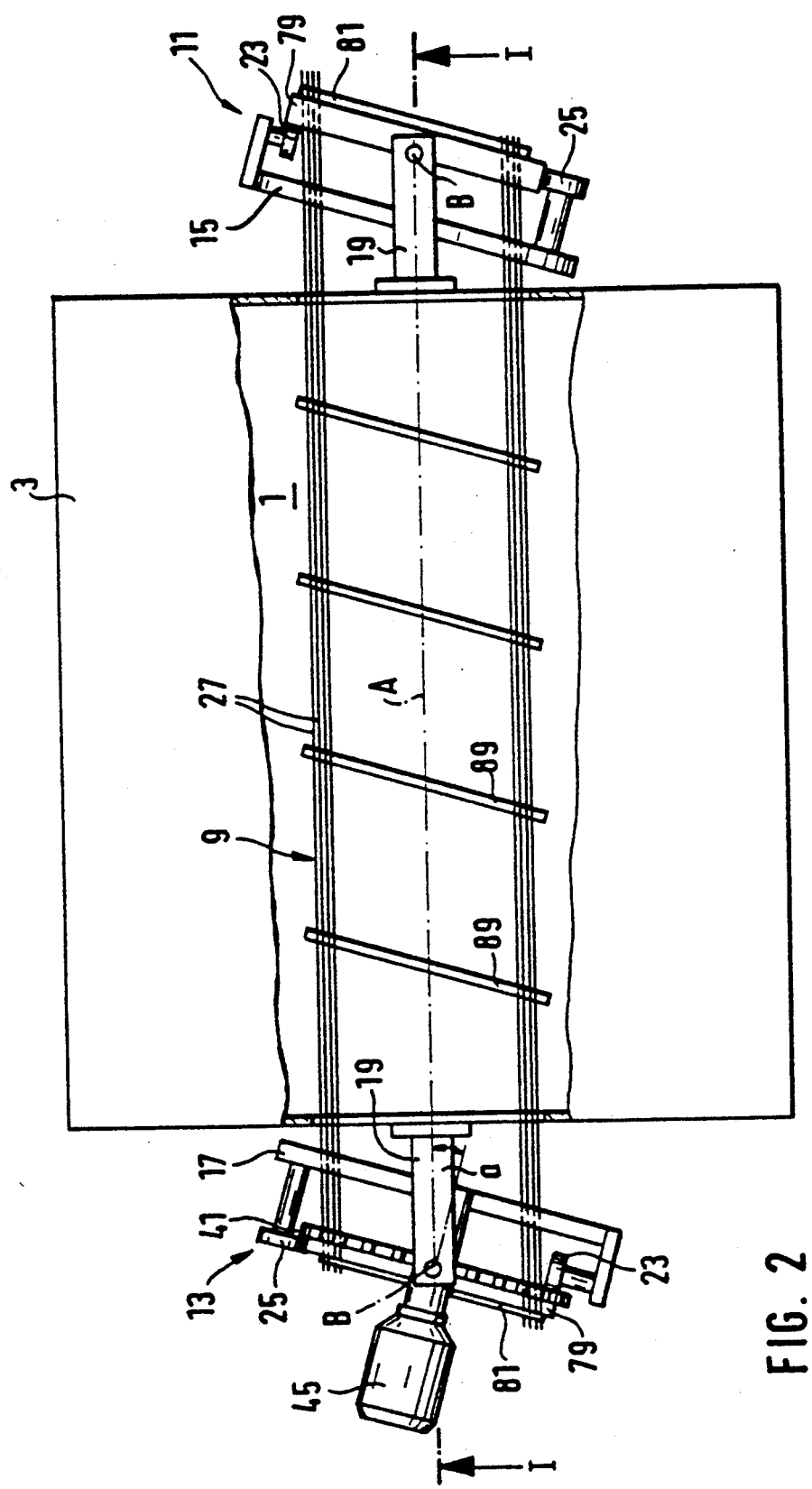
FIG. 2 is a plan view of the apparatus, with certain parts broken away.

FIGS. 1 and 2 show certain details of an apparatus wherein workpieces (one shown at 55 in FIG. 1) are subjected to surface treatment during advancement through the elongated tubular shell of a cage-like receptacle 9 which is rotatable about a horizontal or substantially horizontal axis A. The shell surrounds the axis A and includes elongated rod-like, wire-like, cable-like, cord-like or analogous components 27 including larger-diameter outer components 27' (FIGS. 3 and 4) which are more distant from the axis A and smaller-diameter inner components 27" which are nearer to the axis A.

The receptacle 9 extends through the chamber 1 of a housing 3 in such a way that its end walls 11 and 13 are located externally of the housing. The end walls 11, 13 are respectively mounted in carriers 15 and 17 which are secured (by brackets 19) to the housing 3 in a manner to ensure that each of the carriers is turnable with reference to the housing about a discrete vertical axis B, i.e., about an axis which is normal to and preferably crosses the axis A. The apparatus further comprises adjusting means for changing the inclination of the carriers 15, 17 with reference to the axis A, i.e., for turning the carriers about the respective vertical axes B. The adjusting means includes mating face gears 21 on one of the carriers 19 and on the carrier 15. The common axis of the gears 21 coincides with the respective axis B and the gear on the bracket 19 can be rotated by a handle 121. The orientation of the carrier 17 with reference to the corresponding axis B is changed in automatic response to a change of orientation of the carrier 15 because these carriers respectively support the end walls 11, 13 which are connected to each other by the components 27', 27" of the tubular shell forming part of the receptacle 9. FIG. 2 shows that, in the illustrated embodiment, the planes of the end walls 11, 13 make with the axis A an acute angle alpha. The selected magnitude of the angle alpha will determine the extent of reciprocation of the components 27', 27" in response to rotation of the receptacle 9 about the axis A, i.e., the rate of advancement of one or more workpieces 55 in the shell of the receptacle 9. It is equally within the purview of the invention to omit the adjusting means 21, 121 and to install the carriers 15, 17 in such a way that the planes of the end walls 11, 13 are maintained at a fixed angle alpha with reference to the axis A.

Each of the carriers 15, 17 supports at least three preferably equidistant first rollers 23 and at least three preferably equidistant second rollers 25. These rollers together constitute bearings for the respective end walls 11 and 13, i.e., each of these end walls can rotate relative to three or more rollers 23 and relative to three or more rollers 25. The axes of the rollers 23 on each of the carriers 15, 17 intersect each other on the axis A, and the axes of rollers 25 on each of the carriers 15, 17 extend at right angles to the respective axes B.

Each end wall comprises a ring 79, and the ring 79 of the end wall 13 is surrounded by and connected to or integral with a sprocket wheel or toothed pulley 41. A second sprocket wheel or toothed pulley 47 is mounted on the output shaft of a reversible variable-speed electric motor 45 or another suitable prime mover, and the means for transmitting torque from the motor 45 to the end wall 13 comprises an endless chain or toothed belt 43 which is trained over the parts 41 and 47. The end wall 13 rotates the end wall 11 through the medium of the components 27′ and 27″.

The rings 79 of the end walls 11, 13 are provided with relatively large centrally located openings 51 which are bounded by cylindrical or conical surfaces. The mutual spacing of components 27′ and 27″ in the circumferential direction of the rings 79 depends upon the dimensions and/or weight of workpieces which are to be treated on their way from the opening 51 of the ring 79 forming part of the end wall 13 toward the opening 51 of the other ring 51 or in the opposite direction, depending upon the direction of rotation of the receptacle 9. The rollers 23 engage the sides and the rollers 25 engage the peripheral surfaces of the respective rings 79. Each ring 79 is concentric with an at least partially elastic second ring 81 which can be called an insert and the purpose of which will be described with reference to FIGS. 3 and 4.

The apparatus further comprises one or more annular supporting members 89 which are disposed between the end walls 11, 13 in the chamber 1 of the housing 3 and have holes or bores 91 (FIG. 3) for the respective components 27′, 27″. The arrangement is such that the components 27′ and 27″ extend through the respective holes or bores 91 (hereinafter called holes) with a certain amount of radial play. FIG. 2 shows that the illustrated apparatus comprises a total of four substantially equidistant supporting members 89. The inclination of these supporting members can equal or approximate the inclination of the end walls 11 and 13. Pairs of combined clamping and distancing elements 93 (FIGS. 3 and 4) are provided to hold the supporting members 89 and the components 27′, 27″ against movement relative to each other in the longitudinal direction of the components. The illustrated clamping members 93 are nuts having internal threads in mesh with external threads on the adjacent portions of the respective components 27′ and 27″. The supporting members 89 ensure that the mutual spacing of neighboring components 27′, 27″ in the circumferential direction of the shell of the receptacle 9 remains substantially unchanged which is particularly desirable when the workpieces are small or thin so that they could escape into the chamber 1 around the shell of the receptacle 9 in response to a pronounced widening of the slots between neighboring components 27′ and 27″. The mutual spacing of neighboring inner components 27″ is smaller than that of the outer components, i.e., the workpiece or workpieces 55 are actually engaged, advanced and confined by the tubular array of inner components 27″. The outer components 27′ are subjected to rather pronounced longitudinal tensional stresses by novel and improved universal joints one of which is shown in full detail in FIGS. 3 and 4. The outer components 27′ and the end walls 11, 13 can be said to constitute a skeleton frame of the receptacle 9, and the inner components 27″ can be said to constitute that portion of the tubular shell of the receptacle which confines, guides and advances the workpieces on their way from the end wall 11 toward the end wall 13 or in the opposite direction.

Figure 3:
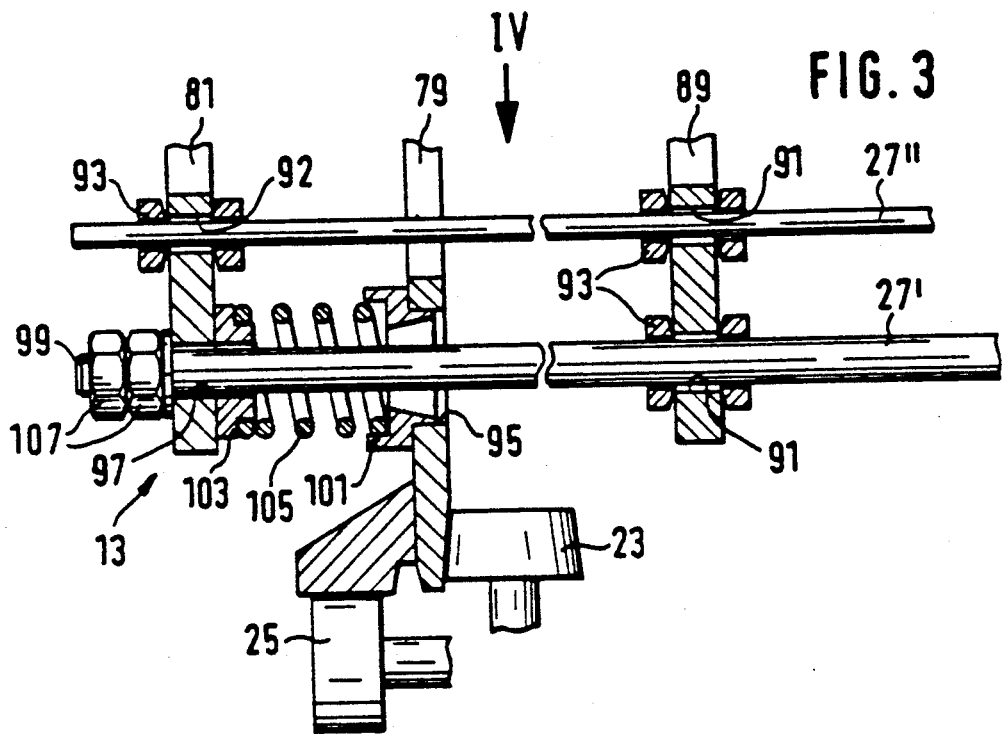
FIG. 3 is an enlarged view of the detail III in FIG. 1.
Figure 4:
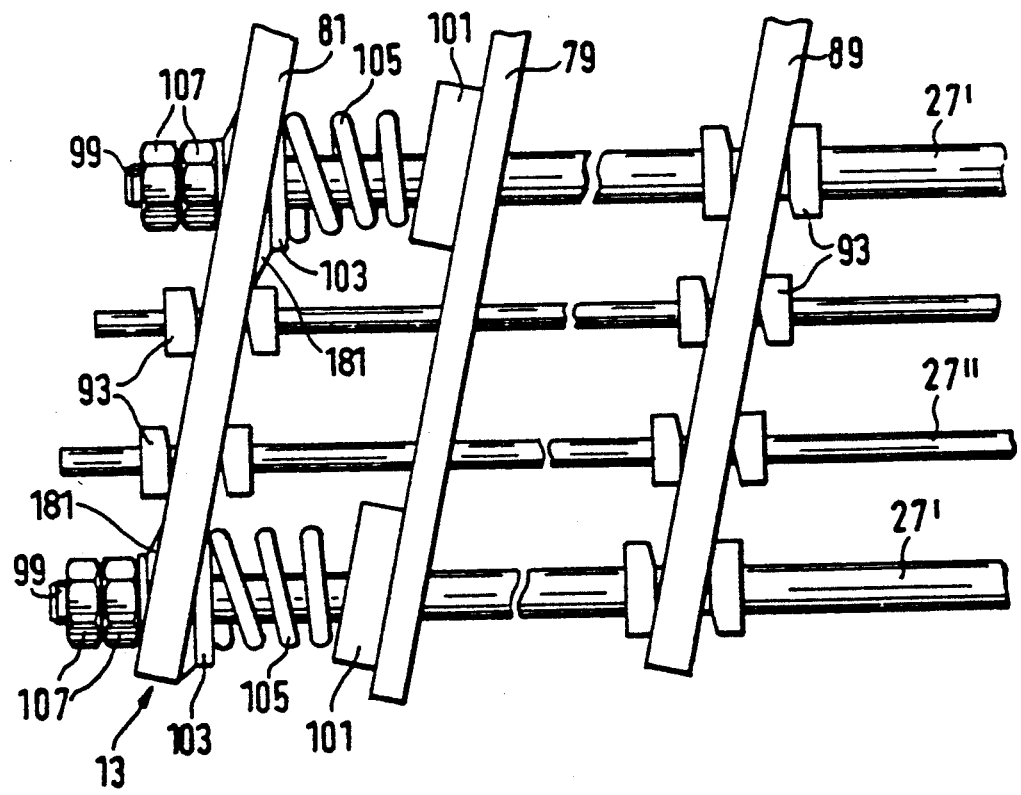
FIG. 4 is a plan view of the structure of FIG. 3 as seen in the direction of arrow IV.

The end portions of the outer components 27′ extend, with considerable radial play, through bores or holes 95 of the rings 79 and, with lesser radial play, through the bores or holes 97 of the ring-shaped inserts 81. The outer ends of end portions of the components 27′ are provided with external threads 99 (FIGS. 3 and 4). The clearances between the end portions of the components 27′ and the surfaces bounding the holes 95 and 97 should suffice to ensure that the components 27′ are not flexed in response to rotation of the receptacle 9 about its axis A, i.e., the components 27′ should not jam in the rings 79 and/or inserts 81 and need not even touch the parts 79, 81 when the receptacle is rotated by the motor 45.

The inserts 81 are disposed outwardly of the respective rings 79, and the space between each insert and the respective ring 79 accommodates pairs of ring-shaped bearings 101, 103 and coil springs 105. The bearings 101 abut the outer sides of the respective rings 79 and extend in part into the respective holes 95, and the bearings 103 abut the inner sides of the respective inserts 81. Each spring 105 reacts against the respective bearing 101 and bears against the respective bearing 103 to thereby subject the corresponding component 27′ to a longitudinal tensional stress because the insert 81 bears against one of two stops 107 in the form of nuts having internal threads in mesh with the external threads 99 of the respective components 27′. The inserts 81 are optional, i.e., the bearings 103 can directly abut the adjacent nuts 107 to ensure adequate axial stressing of the components 27′. The bias of the springs 105 can be changed by rotating the nuts 107 on the respective components 27′. Alternatively, the apparatus can be furnished with two or more sets of springs having different characteristics.

Since the illustrated apparatus employs two ring-shaped inserts 81, these inserts must be configurated, mounted and made in such a way that they do not cause any, or any pronounced, flexing of the respective end portions of components 27′ when the receptacle 9 is caused to rotate about the axis A and the components 27′ move back and forth, at least in the lower portion of the shell, namely beneath the axis A. For example, the inserts 81 can be made of polyurethane and should be capable of undergoing elastic deformation, at least in the regions of their holes or bores 97 (see FIG. 4, as at 181) so that those portions of the inserts which are immediately adjacent and surround the components 27′ are disposed in planes extending at right angles to the longitudinal axes of the components 27′. Thus, while it is not necessary to make the inserts 81 exclusively of an elastomeric material, those portions of the inserts which are clamped between the bearings 103 and the respective nuts 107 should be capable of pronounced elastic deformation in order to remain in planes which are normal to the axes of the components 27′. The readily deformable portions 181 of the inserts 81 are incapable of subjecting the components 27′ to appreciable bending or flexing stresses. This prolongs the useful life of the components 27′ and reduces the frequency and shortens the down times of the apparatus.

The feature that the end portions of the components 27′ are not subjected to any pronounced bending or flexing stresses in spite of the absence of ball joints reduces the likelihood of premature tiring of the material and subsequent breakage of the components 27′ when the apparatus is in use, i.e., when the receptacle 9 rotates about the axis A and the components 27' are compelled to move back and forth because the rings 79 of the end walls 11, 13 cooperate with the respective carriers 15, 17 to act not unlike wobble plates or swash plates and to compel the components 27' to reciprocate when the receptacle is set in rotary motion.

It will be noted that the springs 105 and the associated nuts or stops 107 constitute relatively simple but highly effective universal joints which replace the heretofore used ball joints and enable the components 27' to reciprocate without any, or without any appreciable, flexing when the receptacle 9 is set in rotary motion. All that is necessary is to ensure that the end portions of the components 27' extend through the respective bores or holes 95 of the rings 79 with requisite radial play so that the rigid rings 79 cannot cause pronounced flexing of the components 27' when the apparatus is in use.

The inner components 27" extend, with radial play, through the bores or holes 92 of the inserts 81 and the registering holes 91 of the supporting members 89. The rings 79 can be provided with rather large apertures for the end portions of the components 27". The inserts 81 are flanked by pairs of clamping elements 93 (e.g., internally threaded nuts mating with external threads of the components 27") to hold the end portions of the components 27' against axial movement relative to the inserts 81. The clearances between the components 27" and the surfaces bounding the holes 91, 92 should suffice to prevent jamming of components 27" in the supporting members 89 and/or in the inserts 81. The holes 91 of the supporting members 89 are equidistant from each other in the circumferential direction of the shell of the receptacle 9, the same as the holes or bores 92 in the inserts 81. Those surfaces of the clamping elements 93 which confront the supporting members 89 and the inserts 81 are preferably conical or crowned so that they are in mere linear contact with the adjacent surfaces of the parts 89 and 81. The conicity of such surfaces of the elements 93 preferably matches or even exceeds the selected angle alpha. This ensures that the conical or crowned surfaces of the elements 93 can roll along the adjacent surfaces of the supporting members 89 and inserts 81.

FIG. 1 shows schematically a spraying unit 57 with three nozzles 59 which can propel solid particles, streams of a gaseous fluid and/or streams of a liquid medium against one or more workpieces 55 within the confines of the tubular body formed by the inner components 27". The material which is discharged by the nozzles 59 is caused to flow upwardly and to penetrate through the lower portion of the shell on its way into contact with the workpiece or workpieces 55.

The operation is as follows:

One or more workpieces 55 and/or otherwise configurated and/or dimensioned workpieces are introduced into the receptacle 9 by way of the opening 51 in the ring 79 of the end wall 11 or 13, either by hand or by resorting to suitable conveyor or transfer means. The workpieces come to rest on the components 27" in the lower portion of the shell of the receptacle 9. The operator then selects the inclination (angle alpha) of the planes of the end walls 11, 13 with reference to the axis A, and the motor 45 is started to rotate the receptacle 9 in a clockwise or in a counterclockwise direction. The selected inclination of the planes of the rings 79 determines the extent of reciprocation of the components 27', 27" and hence the speed at which the workpiece or workpieces 55 are advanced in the receptacle 9. The direction of rotation of the receptacle 9 and the orientation of the end walls 11, 13 determine the direction of advancement of the workpiece or workpieces. Each workpiece is caused to tumble and/or perform other movements on its way from one of the end walls 11, 13 toward the other end wall so that each of its sides or surfaces (including the surfaces in cavities, recesses, holes, bores or like configurations) is adequately treated before the workpiece leaves the shell. The treatment can involve bombardment with particles of dust or granulae simultaneously with or without treatment with a gaseous and/or liquid fluid. The agitation of each workpiece is sufficiently pronounced to ensure that the holes, bores, cavities and/or recesses (if any) of the workpieces are not likely to accumulate solid particulate material which is propelled by the nozzles 59 of the spraying unit 57. The distance of those surfaces of workpieces which undergo treatment from the orifices of the nozzles 59 remains substantially constant because the propelled material impinges primarily upon the downwardly facing sides of workpieces in the lower portion of the shell forming part of the receptacle 9. This holds true irrespective of the size and shape of the workpieces in the tunnel between the end walls 11 and 13. By selecting the RPM of the motor 45 (i.e., the rotational speed of the receptacle 9) and/or the angle alpha of the planes of the end walls 11, 13 relative to the axis A, an operator or an automatic control unit can select the period of dwell of a workpiece in the receptacle 9 as well as the duration of treatment of each workpiece by the material issuing from a particular nozzle 59.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for advancing and changing the orientation of workpieces, comprising a rotary receptacle having an axis of rotation and including a tubular shell having an internal space for workpieces, a plurality of elongated first components extending in substantial parallelism with said axis and having first and second end portions, and additional elongated components having first and second end portions, said additional components being disposed at a first distance from said axis and said first components being located at a greater second distance from said axis, said receptacle further having first and second end walls and means for connecting said end walls to the respective end portions of said first components, said end walls having apertures which receive with play the respective end portions of said additional components, said connecting means including universal joints at least between said first end wall and the first end portions of said first components, said joints including resilient means for subjecting said first components to longitudinal tensional stresses; and means for rotating said shell about said axis to thereby reciprocate said first components at least in a predetermined portion of said shell, including means for maintaining said end walls at an oblique angle to said axis while said shell rotates.

2. The apparatus of claim 1, further comprising at least one annular supporting member intermediate said first and second end walls, said supporting member having holes and said components extending with play through the holes of said at least one supporting member.

3. The apparatus of claim 2, further comprising means for holding said supporting member and at least some of said components against movement relative to each other in the longitudinal direction of said components.

4. The apparatus of claim 3, wherein said holding means comprises pairs of clamping elements engaging said at least some components and flanking said supporting member.

5. The apparatus of claim 1, wherein said predetermined portion is disposed beneath said axis.

6. The apparatus of claim 1, wherein said connecting means include universal joints between each of said end walls and the respective end portions of said first components.

7. The apparatus of claim 1, wherein said first end wall has holes for said first components, the first end portions of said first components extending with radial play through and outwardly beyond said first end wall, said joints further including stops provided on the first end portions of said first components and said resilient means including springs reacting against said first end wall and bearing against the respective stops.

8. The apparatus of claim 7, wherein said springs include axially stressed coil springs surrounding the first end portions of the respective first components.

9. The apparatus of claim 7, wherein the first end portions of said first components have external threads and said stops include nuts having internal threads mating with the external threads of the respective first end portions.

10. The apparatus of claim 7, further comprising bearings interposed between said springs and the respective stops.

11. The apparatus of claim 7, further comprising a deformable insert interposed between said springs and said stops.

12. The apparatus of claim 11, wherein said first end wall includes a first ring which is provided with said holes and said insert includes a second ring which is concentric with said first ring.

13. The apparatus of claim 12, wherein said second ring has holes for the first end portions of said first components and is elastically deformable at least in the regions of said holes therein.

14. The apparatus of claim 2, wherein said end walls include rings which are indirectly connected with the respective end portions of said first components.

15. The apparatus of claim 1, wherein said axis is substantially horizontal and said shell includes a lower portion constituting said predetermined portion thereof.

* * * * *